US010067927B2

(12) United States Patent
Myerscough et al.

(10) Patent No.: US 10,067,927 B2
(45) Date of Patent: Sep. 4, 2018

(54) UPDATES TO SHARED ELECTRONIC DOCUMENTS IN COLLABORATIVE ENVIRONMENTS

(71) Applicant: Microsoft Technology Licensing, LLC, Redmond, WA (US)

(72) Inventors: Micah Myerscough, Redmond, WA (US); Tarek Hefny, Redmond, WA (US); Nagamani Kusampudi, Redmond, WA (US); Tony Valey, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 13/918,734

(22) Filed: Jun. 14, 2013

(65) Prior Publication Data

US 2014/0372855 A1 Dec. 18, 2014

(51) Int. Cl.
| | | |
|---|---|---|
| *G06F 17/00* | (2006.01) | |
| *G06F 17/24* | (2006.01) | |
| *G06Q 10/10* | (2012.01) | |
| *G06F 17/30* | (2006.01) | |
| *G06F 17/22* | (2006.01) | |

(52) U.S. Cl.
CPC ........ *G06F 17/246* (2013.01); *G06F 17/2288* (2013.01); *G06F 17/30165* (2013.01); *G06F 17/30575* (2013.01); *G06Q 10/10* (2013.01)

(58) Field of Classification Search
CPC ..... G06F 17/246; G06Q 10/10; G06Q 10/101
See application file for complete search history.

(56) References Cited

U.S. PATENT DOCUMENTS

| | | |
|---|---|---|
| 7,756,824 B2 | 7/2010 | Campbell et al. |
| 8,108,779 B1 | 1/2012 | Rein et al. |
| 8,386,728 B1 | 2/2013 | Ionescu et al. |
| 8,429,521 B2 | 4/2013 | Lloyd et al. |
| 8,504,519 B1 * | 8/2013 | Sachs ........................ G06F 8/71 707/616 |
| 8,832,588 B1 * | 9/2014 | Kerzner et al. ............... 715/781 |

(Continued)

FOREIGN PATENT DOCUMENTS

CN 101454774 A 6/2009

OTHER PUBLICATIONS

PCT International Search Report and Written Opinion in International Application PCT/US2014/041056, dated Oct. 30, 2014, 12 pgs.

(Continued)

*Primary Examiner* — Howard Cortes

(57) ABSTRACT

Systems and methods are described to manage the exchange of information between multiple networked devices in a shared electronic document environment. In an embodiment, a computer implemented method of exchanging information in a collaborative networked environment is performed. The method may include receiving a first active region from a first client, receiving indicia of a change to a shared electronic document, and determining that the first client requires an update. The determining step may include determining the change will affect the first active region, and determining the relevant-change data to send to the first client. Additionally, the method may include sending the relevant-change data to the first client.

20 Claims, 14 Drawing Sheets

(56) References Cited

U.S. PATENT DOCUMENTS

| | | | |
|---|---|---|---|
| 2003/0014513 A1 | 1/2003 | Ruths et al. | |
| 2006/0101064 A1* | 5/2006 | Strong | G06F 17/30038 |
| 2006/0136510 A1* | 6/2006 | Voronov | G06F 17/24 |
| 2007/0233811 A1 | 10/2007 | Rochelle et al. | |
| 2008/0059539 A1* | 3/2008 | Chin | G06Q 10/10 |
| 2009/0112937 A1* | 4/2009 | Campbell | G06F 17/246 |
| 2010/0205520 A1* | 8/2010 | Parish | G06F 17/246 715/212 |
| 2010/0325533 A1* | 12/2010 | Artz | G06F 17/30905 715/235 |
| 2011/0252300 A1* | 10/2011 | Lloyd | G06F 17/246 715/217 |
| 2011/0307772 A1* | 12/2011 | Lloyd | G06F 17/2247 715/212 |
| 2012/0233555 A1 | 9/2012 | Psistakis et al. | |
| 2012/0284344 A1* | 11/2012 | Costenaro | G06F 17/241 709/206 |
| 2013/0047093 A1 | 2/2013 | Reuschel et al. | |
| 2013/0097234 A1* | 4/2013 | Beinvel et al. | 709/204 |
| 2013/0254157 A1* | 9/2013 | Havlin et al. | 707/608 |
| 2013/0339847 A1* | 12/2013 | Bartek | G06Q 10/10 715/255 |
| 2014/0033009 A1* | 1/2014 | Rein et al. | 715/212 |
| 2014/0082470 A1* | 3/2014 | Trebas et al. | 715/217 |
| 2015/0193492 A1* | 7/2015 | Gunaratne | G06F 21/6218 707/609 |

OTHER PUBLICATIONS

Gamma et al., "Design Patterns. Observer", Jan. 1, 2000, Design Patterns. Elements of Reusable oblect-oriented software, Addison-Wesley Professional Computing Series, Addison-Wesley. Boston. Mass., pp. 293-304.

Deolasee, et al., "Adaptive Push-Pull: Disseminating Dynamic Web Data", In IEEE Transactions on Computers, May 1, 2001, 10 pages.

"An Introduction to Excel Services", Published on: Oct. 30, 2011, Available at: http://msdn.microsoft.com/en-us/library/bb758869(v=office.12).aspx, 31 pages.

"International Preliminary Report on Patentability Issued in PCT Application No. PCT/US2014/041056", dated Aug. 31, 2015, 8 Pages.

"First Office Action and Search Report Issued in Chinese Patent Application No. 201480045290.X", dated May 3, 2018, 11 Pages.

* cited by examiner

Mobile Computing Device

UPDATES TO SHARED ELECTRONIC DOCUMENTS IN COLLABORATIVE ENVIRONMENTS

BACKGROUND

Networked computer systems provide the opportunity for people to collaborate by using computers or terminals connected to the network. These people, known as users, may collaborate with other users by way of shared electronic documents. Sharing electronic documents occurs when one user has access to an electronic document at the same time that another user has access to an electronic document. For example, a user might interact with a spreadsheet at the same time another user interacts with that same spreadsheet.

During the course of sharing electronic documents, changes often occur to the document. These changes may impact a user's experience, or they may not, depending on the user's current interaction with the document. For example, an initial user may make a change to a shared electronic document, and, in some instances, it may be valuable for another user to be provided with information regarding the change. The value may result because the other user is interacting with a portion of the shared electronic document that is affected by the change. Other times, there may be little value in the other user receiving information regarding the change. For example, there may be little value in sending a change when the other user is interacting with, e.g., viewing, a portion of the shared electronic document that is not affected by the change.

As such, it is desirous to manage how and when a user's computer, also referred to as a client computer, receives information with respect to changes made in a shared electronic document. Previous attempts to manage this information exchange include a client requesting information regarding changes to a shared electronic document at regular intervals. This, however, often led to large amounts of unneeded traffic on the network and long delays for the information to travel between machines. For example, the client would send requests even though there were no changes to the shared-electronic document.

Additionally, large portions of the client's computational resources were used in previous attempts to manage handling changes to a shared electronic document. This typically occurs because shared electronic documents contain large amounts of information. As such, it is often impractical to send all of the information contained in the electronic document in response to a request. A previous work-around was to send compressed and/or coded information sufficient for the client to recreate the shared-electronic document change. Decompression and translation of this information, however, often taxed the computational capabilities of the client.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Systems and methods are described to manage the exchange of information between multiple networked devices in a shared electronic document environment. In an embodiment, a computer implemented method of exchanging information in a collaborative networked environment is performed. The method may include receiving a first active region from a first client, receiving indicia of a change to a shared electronic document, and determining that the first client requires an update. The determining step may include determining the change will affect the first active region, and determining the relevant-change data to send to the first client. Additionally, the method may include sending the relevant-change data to the first client.

In another embodiment, a computer-readable storage medium stores computer-executable instructions. These instructions, when executed, may perform a method of exchanging information in a collaborative networked environment. The method may include receiving a first active region from a first client, receiving indicia of a change to a shared electronic document, and determining that the first client requires an update. The determining step may include determining the change will affect the first active region, determining relevant-change data to send to the first client. Additionally, the method may include sending the relevant-change data to the first client.

Additionally, a system for exchanging information in a collaborative networked environment may be used. In an embodiment, the system may include a computer processor electronically coupled to an input device, an output device, a network communication device, a storage device, and memory. The network communication device may receive information regarding a shared electronic document. The output device may display information regarding the shared electronic document through a viewport. The network communication device may send information regarding an active region of the shared electronic document. The network communication device may additionally receive relevant-change data regarding the shared electronic document. Additionally, the network communication device may receive the relevant-change data, and the active region of the shared electronic document may be updated based upon the relevant-change data.

BRIEF DESCRIPTION OF THE DRAWINGS

Non-limiting and non-exhaustive embodiments are described with reference to the following Figures in which.

DETAILED DESCRIPTION

Figure 1:
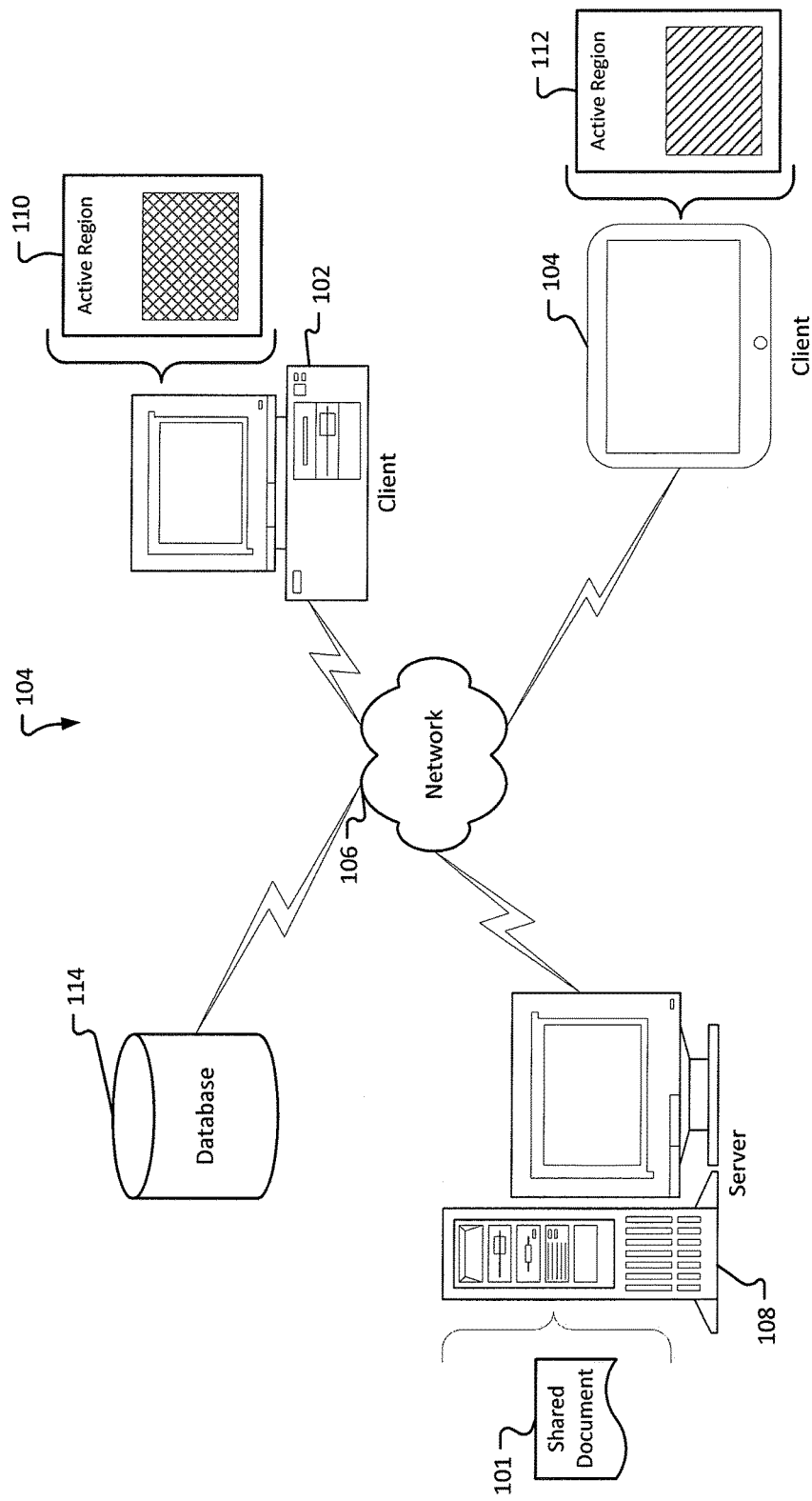
FIG. 1 illustrates an embodiment of a networked system for managing information exchanges related to changes to shared electronic documents.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation, or an implementation combining software and hardware aspects. The following detailed description is, therefore, not to be taken in a limiting sense.

Users may interact with various types of electronic documents in a shared electronic document environment. Some examples of electronic documents include spreadsheets, presentation slides, word processing documents, and image documents. Though this disclosure may make references to electronic documents in the context of spreadsheets, such disclosure should not be taken in a limiting sense. For example, this disclosure may use the word "active region" in reference to a particular area of a spreadsheet, such as the cells that are currently in view or a predetermined number of cells whether the cells are in view or not. For example, the disclosure may reference two or more cells as an active region. Though "cell" is traditionally discussed in the context of spreadsheet applications, the concept of an active region of an electronic document with determinable and discrete borders is applicable to other electronic documents as well. In word processing documents, for example, the active region may be a page, a footer region, a header region, a text box, an image box, etc. Similarly, with respect to presentation slides, the active region may be individual slides, text boxes within slides, header regions, footer regions, etc. Image files may have layers and image boxes that are examples of active regions. Thus, it is contemplated that one skilled in the art will appreciate embodiments of the present disclosure may include many other forms of electronic documents. Also, it is contemplated that one skilled in the art may identify and use other predetermined boundary conditions to determine an active region.

Embodiments of systems and methods are disclosed for managing the flow of information between a client and server in a shared electronic document environment. In an embodiment, the flow of information occurs when a shared electronic document is changed. For example, a number of users may be accessing an electronic document, and the electronic document may be stored on a server. A first user may change the electronic document, e.g., enter information into a cell of a spreadsheet. It may be useful for a second user to receive information related to that change, e.g., because the information the second user is actually viewing is now out of date or inaccurate. Or, perhaps, the second user is viewing a cell that is linked to the cell that has had its contents changed by the first user. Additionally, it may be useful to the second user to receive information because the user will soon interact with the changed cell or cells linked to the changed cell. In other instances, however, it may not be useful for a user to receive updated information related to the change because the updated information does not impact the second user's interaction with the electronic document, e.g., when the second user is viewing an unrelated, un-impacted portion of the document.

FIG. 1 illustrates an embodiment of a networked system 100 for managing information exchanges related to changes to a shared electronic document 101. As illustrated, a first client 102 and a second client 104 are connected to a server 108 through a network 106. In an embodiment, a database 114 is connected to the network 106 as well. The first client 102 has a first-client active region 110, and the second client has a second-client current active region 112. In embodiments, in response to changes to a shared electronic document 101, the server 106 determines whether to send updates to clients 102 and 106 based on whether the changes affect the active regions 110 and/or 112.

A first client 102 and a second client 104 connect to a network 106. The clients 102 and 104 may be any computer system including, wired and wireless computing systems, mobile computing systems (e.g., mobile telephones, netbooks, tablet or slate type computers, and laptop computers), and desktop computers, and the like. As illustrated, the first client computer 102 is a desktop computer, and the second client computer 104 is a tablet. However, one skilled in the art will appreciate that clients 102 and 104 are merely exemplary devices and other devices may be used to achieve the functionality described herein.

First client 102 has a first-client active region 110, and the second client 104 has a second-client active region 112. Generally, an active region is a region of a shared electronic document that the user is or will likely be interacting with. Active regions include regions useful to support a user's current or, in some cases, the user's potential near-future interactions. In embodiments, the first-client active region 110 is the viewport of the first client 102. An active region 110 that is a viewport is the information related to the shared electronic document 101 displayed on the first client's 102 computer display, monitor, or other output device. Similarly, the second-client active region 112 may be the viewport of the second client 104. Such a viewport is the current information related to the shared electronic document 101 displayed on the second client's 104 computer display, monitor or other output device. The clients 102 and 104 typically include physical hardware such as one or more computer processors, memory, communication connections, and input/output devices and can determine and relay viewport and/or active region information.

A network 106 facilitates communication between clients, servers, and databases. There are numerous types of networks that one could employ to allow devices to communicate with each other. Communication may occur through the use of wireless and/or other technologies. For example, the network 106 could be the Internet or a local area network ("LAN"). In a particular embodiment, the network 106 may be a tightly coupled business network where the server system is relatively "dedicated" to a small number of computers in a LAN environment.

The server 108 serves the requests of one or more clients, such as clients 102 and 104. In an embodiment, the server 108 is a computer, or series of computers, linked together that serves the requests of other computer programs, such as computer programs of the client(s). The server 108 includes a computer program running to serve the needs of clients, such as the first client 102 and the second client 104. The server 108 also typically includes physical hardware such as one or more computer processors, memory, one or more hard drives, communication connections, and input/output devices.

Through the network 106, the first client 102 and the second client 104 request services from the server 108. For example, the client 102 may request for the server 108 to render a webpage. This webpage may, for example, be a webpage that includes a rendition of an electronic document, such as a spreadsheet 101. Additionally, the server 108 may respond to requests from a first client 102 or a second client 104 by delivering HTML script, applets, C++ code, or other computer instructions. These instructions, when executed, provide a first client 102 and a second client 104 with a rendition of an electronic document, such as a spreadsheet 101.

The database 114 is an organized collection of data. Typically a database management system is employed to manage the collection, organization, and retrieval of the data stored on the database 114. As illustrated, the database 114 is a networked database, though it need not be. In embodiments, the database 114 stores information related to servicing the needs of the client. Additionally, the database 114 may store information related to the first client 102 and the second client 104.

Users using a first client computer system 102 or a second client computer system 104 may interact with renditions of a shared electronic document. For example, a user may view the rendition of the shared electronic document through a viewport. Additionally, the user makes a change information associated with the shared electronic document, such as entering a number into a cell of a spreadsheet, among many potential edits the user can make. Editing the document causes an update to the shared electronic document both locally and on the server 108. For example, if a user using a first client 102 inputs data into a cell of the shared electronic document, the client 102 may send information through the network 106 to the server 108. The server 108 will interpret the data and change the shared electronic document appropriately.

Additionally, the server 108 may send data that has been determined to be relevant to the other client, such as client 104, as a result of the other client's active region, through the network 106 to the second client 104. The relevant-change data will then cause the rendition of the electronic document on the second-client 104 to change appropriately. This change may or may not affect the information displayed through the second-client viewport 112. That is, although it may not change the displayed information, it is sent to the second client based on the second client's active region.

Relevant-change data is conceptualized as data that has been determined by the server to be relevant based on a client's active region and is sent in response to a change to a shared electronic document. Relevant-change data does not require a client to request the information from a server. Further, relevant change data need not be sent to a receive client in response to every change to a shared electronic document.

As such, in an embodiment relevant-change data will be sent to a client when a change is received to a portion of an electronic document that affects the client's active region. Relevant-change data may be sent through any rapid communication channel, such as a long polling architecture, sockets architecture or any other rapid communication architecture. The initial change need not be made to an area in the client's active region. For example, an initial change in a spreadsheet may change many more cells through formulas and links, etc., and some information in the spreadsheet may be modified indirectly due to the initial change. The indirect modifications may be to cells of a client's active region. In such a case, the client will receive relevant-change data.

Figure 2:
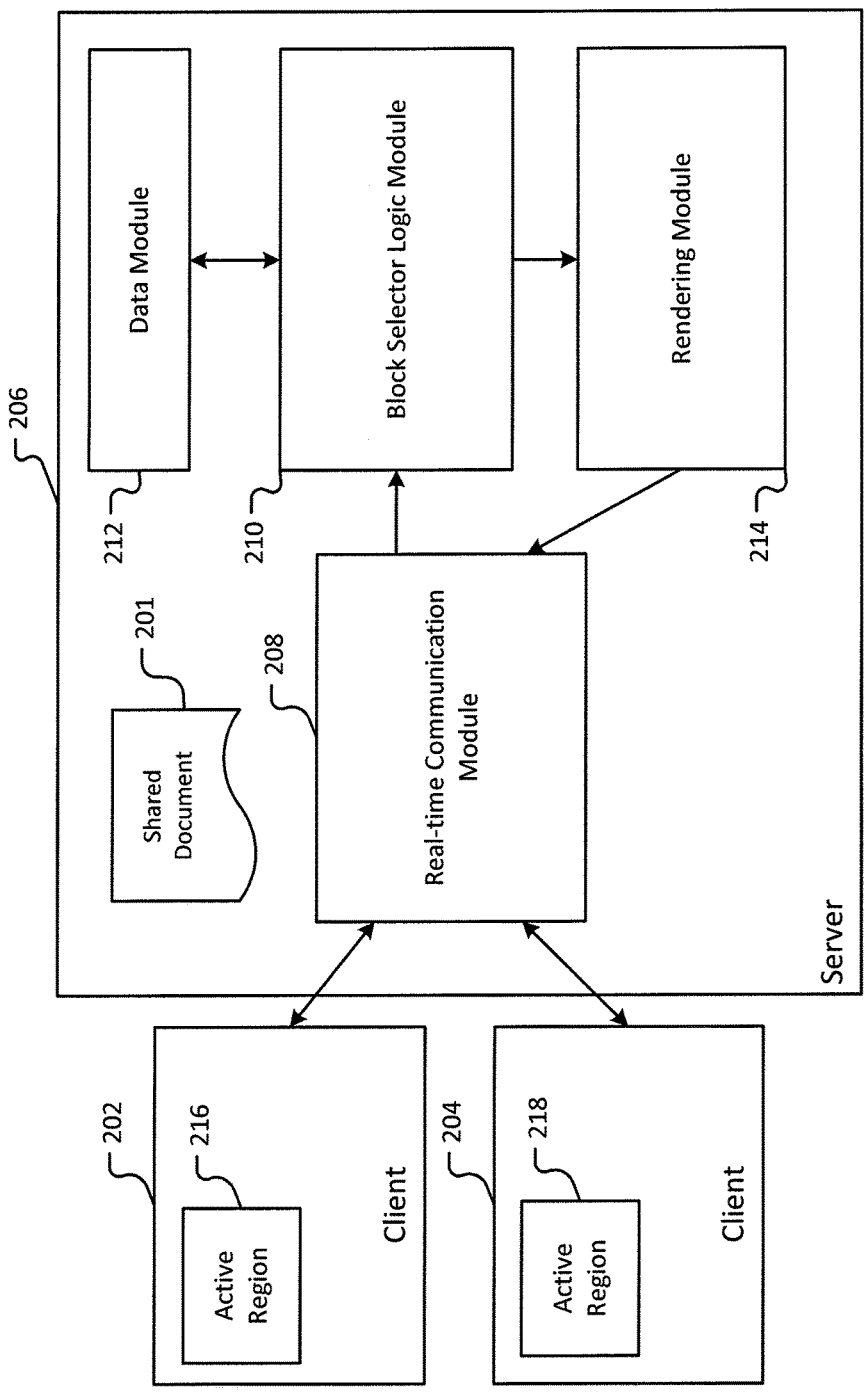
FIG. 2 illustrates an embodiment of an environment of modules of a client and a server suitable for managing information exchanges related to changes to shared electronic documents.

FIG. 2 illustrates an embodiment an environment 200 of modules of a client and a server suitable for managing information exchanges related to changes to a shared electronic document 201. Client 202 and client 204 are communicatively coupled to server 206 through the use of a real-time communication module 208. The real time communication module sends information to a block selector logic module 210. The block selector logic module 210 is communicatively coupled to a data module 212. Additionally, the block selector logic module 210 sends information to a rendering module 214. Further, the rendering module 214 sends information to the real-time communication module 208.

Client 202 and client 204 access one or more shared electronic documents 201 from the server 206. In embodiments, the first client 202 uses a web browser to send requests to the server 206 to access a shared electronic document 201. The server 206 may respond by sending the first client 202 with a rendition of the shared electronic document 201. The second client 204 may also use a web browser to send requests to the server 206.

After accessing a shared electronic document 201, a client will send information related to its current active region. For example, the first client 202 will send information to the server 206 regarding the first-client active region 216. The server 206 receives the information using the real-time communication module 208, where a real time communication module 208 is a module configured to receive and interpret messages from one or more clients. The real-time communication module 208 sends the information to the data module 212, where the data module 212 is a module configured to receive, interpret, categorize, update, store, and/or retrieve information related to the shared electronic document 201. In embodiments, the data module 212 stores information related to the first-client active region 216 in a local or networked database 220.

The process of server 206 storing active region information for clients may repeat. For example, a second client 204 may be accessing the shared electronic document 201. In an embodiment, the second client 204 will have a second-client active region 218. The second client 204 will send information related to second-client active region 218 to the server 206. The server 206 will receive the information using the real-time communication module 208, and the server 206 will store the information using the data module 212. In other embodiments, the block selector logic module 212 stores the information.

When accessing a shared electronic document 201, the first client 202 may change information of a shared electronic document 201. For example, the shared electronic document 201 may be a spreadsheet, and a first client 202 may enter a number into a cell of the spreadsheet. In this example, the change may occur through the following process. The first client 202 sends information to the server 206, which receives the information using a real-time communication module 208. The real-time communication module 208 then communicates with a data model 212 to update the shared electronic document 201. In alternative embodiments it is the block selector logic module that receives the information from the real-time communication module 208.

In response to a client changing the shared electronic document 201, such as a first client 202 changing the shared electronic document 201, the data block selector module 210 determines whether to send an update to other clients accessing the shared electronic document 201, such as second client 204. Additionally, in some embodiments, the data block selector module 210 determines whether to send an update to the same client that requested the change.

The data block selector module 210 may receive an indication that a shared electronic document 201 has been changed by a client, such as a first client 202. This indication may come from the real-time communication module 208. Or the indication may come from the data module 214. One skilled in the art will appreciate that the indication may come from other modules not shown in FIG. 2.

In embodiments, after receiving the indication that a shared electronic document 201 has been changed by a client 202, the block selector logic module 210 sends a request to the data model module 214. The request includes a request for information regarding the current active regions of clients accessing the shared electronic document associated with the change. For example, block selector logic module 210 may request information regarding the first-client active region 216 and a second-client active region 218. The data module 212 then retrieves the information requested by the block selector module 210 and delivers the information to the block selector module 210.

The block selector logic module 210 then determines whether to send a client an update using the first-client active region 216 and a second-client active region 218 and the indication that an electronic document has been changed. For example, the block selector logic module 210 may have received an indication that a first client 202 has made a change to a shared document. The block selector logic module 210 may then determine that, based on the second-client active region 218, the second client 204 should receive information related to the change. This information is referred to as "relevant-change data" and is discussed more with reference to FIG. 1. Additionally, determining whether to send a client an update is discussed more with reference to FIG. 8.

If the block selector logic module determines that relevant-change data should be sent to a client, such as a second client 204, the block-selector component determines what information to send to the client. For example, the block selector logic module 208 may determine that relevant-change data should include new information sufficient for a second client 204 to display a new viewport. The block selector logic module may determine that different and/or additional information should be sent to the second client 204. Determining what relevant-change data to send is discussed more with reference to FIG. 9.

After determining what relevant-change data to send, the block selector logic module 210 then sends a request to the data module 212 for the relevant-change data. For example, the block selector logic module 212 may request relevant-change data sufficient to send a new viewport to a second client 204. In other embodiments, the block selector logic module 212 may send information sufficient for the second client 204 to update the second-client active region 218. In embodiments the data selector module 212 sends the relevant-change data to the block selector logic module 210, and the block-selector logic module 210 evaluates the relevant-change data. Further, the block selector logic module 210 may then send the relevant-change data to a rendering module 214. In other embodiments, the data module 212 sends the relevant-change data directly to the rendering module 214.

The rendering module 214 is a module that renders information, including the relevant-change data, into a format that is usable by a client. For example, the format may be one that is suitable for interpretation by a web browser that is stored on a client, such as a second client 204. Once the relevant-change data is rendered, the rendering module 214 transmits the rendered relevant-change data to the real-time communications module 208. The real-time communications module 208 then sends the rendered-relevant-change data to a client, such as a second client 204.

Figure 3:
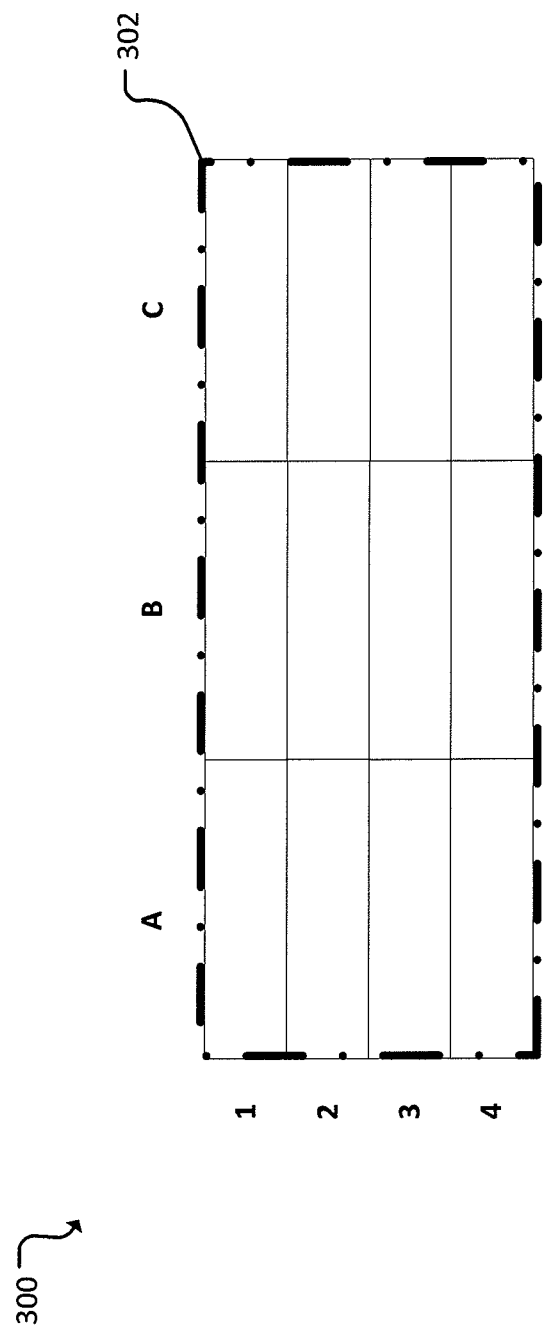
FIG. 3 illustrates an embodiment of a shared electronic document that has an active region that is bounded by the viewport perimeter.
Figure 4:
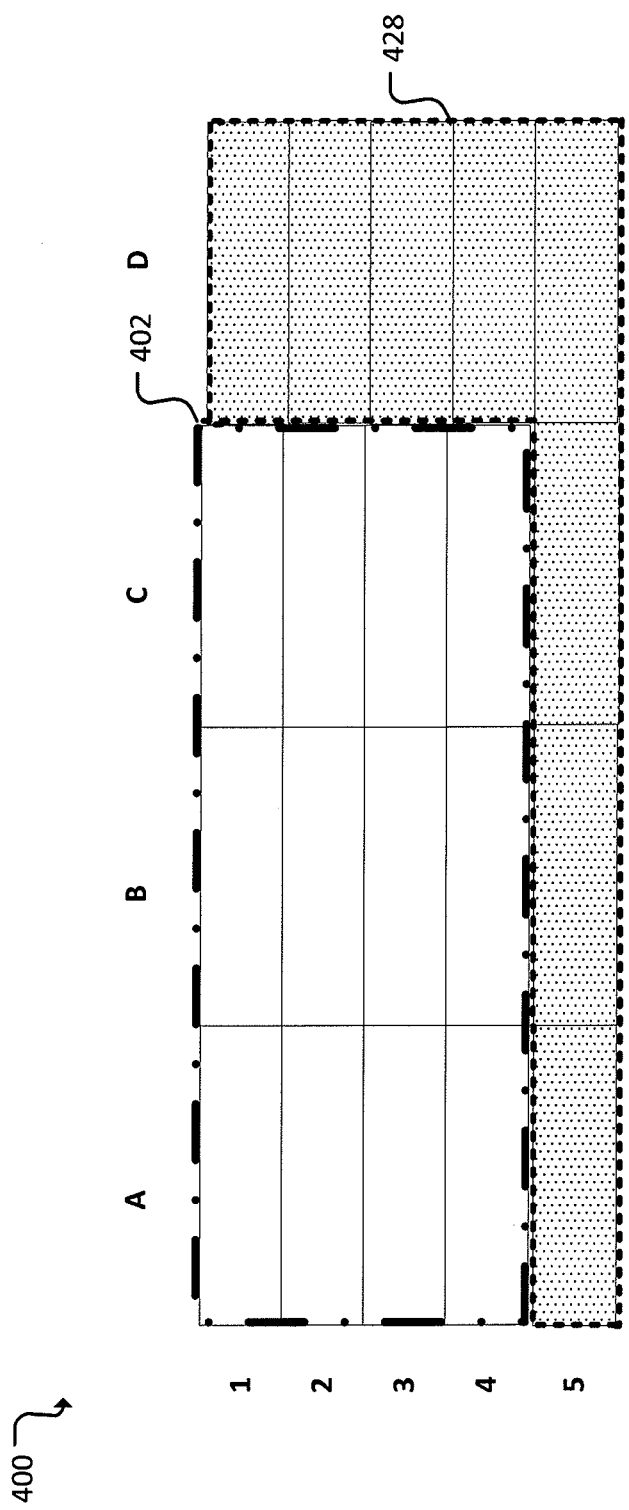
FIG. 4 illustrates an embodiment of a shared electronic document that has an active region that includes a viewport in combination with a nonvisible region.
Figure 5:
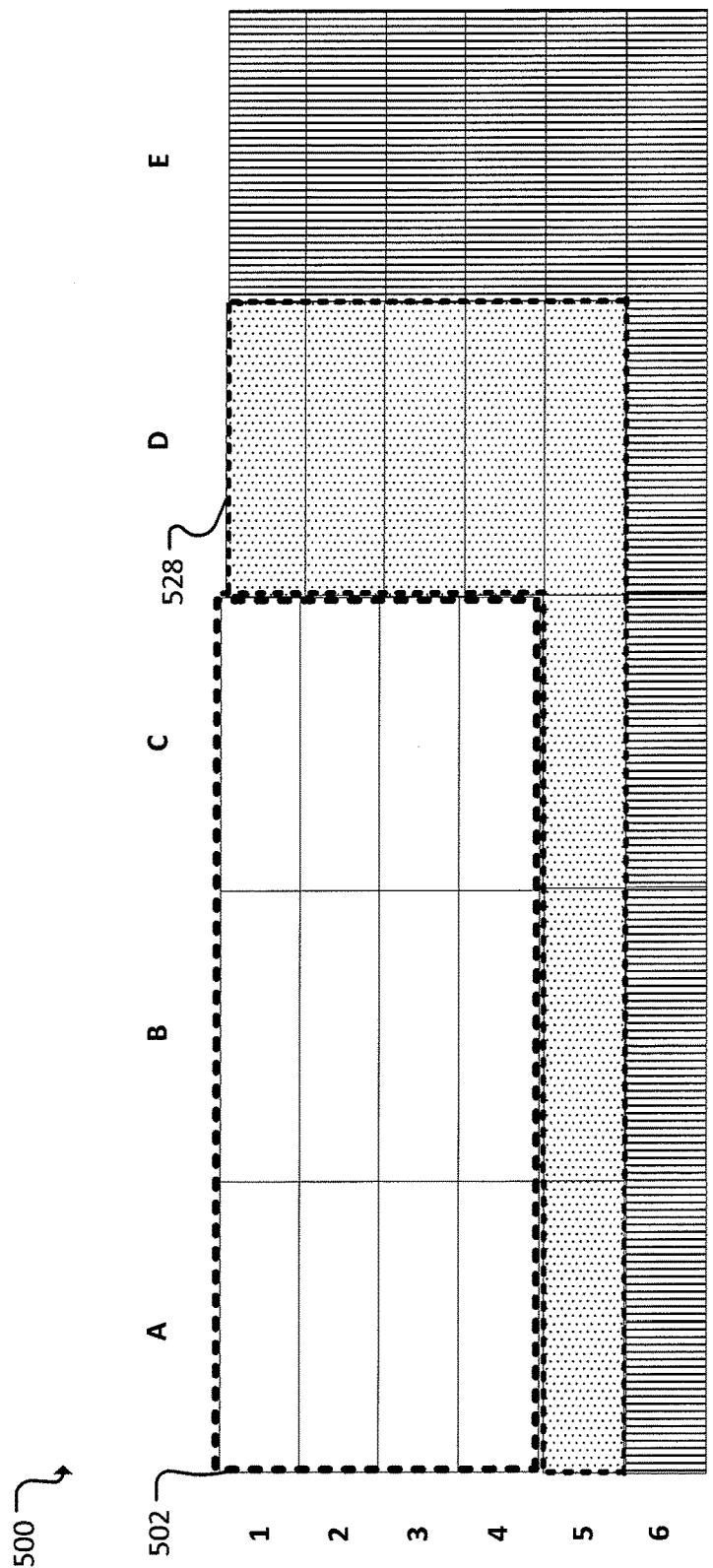
FIG. 5 illustrates an embodiment of a shared electronic document that includes an active region that has a nonvisible and a visible region.

Given that relevant-change data will be sent to a second client if a change has been received that affects the second client's active region, the determination of that second client's active region is necessary. FIG. 3, FIG. 4, and FIG. 5 each illustrate embodiments of active regions and touch on how such active regions can be determined. In some embodiments, the current active region is the current viewport. In other embodiments, the active region includes the entire active region, plus regions beyond the viewport. For example, in embodiments where the shared electronic document is a spreadsheet and the client is interacting with the spreadsheet through the use of a browser, the active region may be the current portion spreadsheet displayed by the web browser, i.e., the viewport. Alternatively, the active region may include areas above, below, or to the sides of the current viewport. This active region may be particularly useful where a user is likely to scroll. The active region, in other embodiments, may be smaller than that of the viewport.

Additionally, bounded areas are illustrated in FIG. 3, FIG. 4, and FIG. 5. Though a figure may contain a single bounded area, it will be appreciated that multiple bounded areas are possible. For example, a bounded area may be shown as being a single area with a rectangular perimeter. However, the bounded area may be a series of discrete bounded areas. Additionally, the shape need not be rectangular. Indeed, the series of bounded areas need not share a boundary.

With reference to FIG. 3, FIG. 3 illustrates an embodiment of a shared electronic document 300 that has an active region that is bounded by the viewport perimeter 302. As illustrated, the viewport perimeter 302 bounds cells of a spreadsheet. For example, cells A1, A2, A3, A4, B1, B2, B3, B4, C1, C2, C3, and C4 are bounded by the viewport perimeter 302. As such, cells A1, A2, A3, A4, B1, B2, B3, B4, C1, C2, C3, and C4 are considered included in the active region.

In embodiments, the viewport perimeter 302 is determined by the portion of the shared electronic document displayed by a client. For example, the shared electronic document may be displayed by a web browser of a client.

Alternatively, the shared electronic document may be displayed by another application running on a client that interacts with a server. As illustrated, viewport perimeter 302 captures all of a shared electronic document. Though only the cells of a spreadsheet are illustrated, an entire shared electronic document may include menus, header, and footer regions. Additionally, a viewport perimeter may bound other types of shared electronic documents such as word processing documents, presentation slides, and image documents.

FIG. 4 illustrates an embodiment of a shared electronic document 400 that has an active region that includes a viewport in combination with a nonvisible region. As illustrated, a shared electronic document 400 includes cells of a spreadsheet. For example, a viewport perimeter 402 bounds cells A1, A2, A3, A4, B1, B2, B3, B4, C1, C2, C3, and C4. Additionally, a nonvisible perimeter 428 bounds the remainder of the cells of a spreadsheet. As illustrated, the nonvisible perimeter 428 bounds cells A5, B5, C5, D1, D2, D3, D4, and D5. Consequently, a shared electronic document 400 includes the cells A1, A2, A3, A4, A5, B1, B2, B3, B4, B5, C1, C2, C3, C4, C5, D1, D2, D3, D4, and D5.

The viewport perimeter 402 has similar properties as those of viewport perimeter 302 discussed with reference to FIG. 3. Additionally, though the viewport is perimeter 402 is shown as bounding the whole cell, it need not bound the whole cell. Indeed, a viewport perimeter 402 can bound portions of a cells of a spreadsheet, or portions of other regions of a document. The nonvisible perimeter 428 bounds nonvisible cells that have been determined to be useful to a user interacting with a client. As illustrated, cells below and to the left of a current viewport have been determined to be useful to a user interacting with a client. This may occur where user is likely to scroll to the bottom or the left. Other embodiments include nonvisible active regions that are to the top or to the right of a current viewport of a client. Still others may include nonvisible active regions that are on a different portion of a shared-electronic document than the current viewport such as a different sheet of a spreadsheet workbook, a different page of document, or a different slide or a presentation document.

FIG. 5 illustrates an embodiment of a shared electronic document 500 that includes an active region that has a nonvisible and a visible region. The shared electronic document also includes a nonvisible, non-active region. As illustrated, a shared electronic document 500 includes cells of a spreadsheet. For example, a viewport perimeter 502 bounds cells 5 A1, A2, A3, A4, B1, B2, B3, B4, C1, C2, C3, and C4. Additionally, a nonvisible perimeter 528 bounds the nonvisible cells that are part of an active region of a shared electronic document 500. As illustrated, the nonvisible perimeter 528 bounds cells A5, B5, C5, D1, D2, D3, D4, and D5. Consequently, an embodiment of the active region of a shared electronic document 500 includes the cells A1, A2, A3, A4, A5, B1, B2, B3, B4, B5, C1, C2, C3, C4, C5, D1, D2, D3, D4, and D5. Additionally, shared electronic document 500 has a nonvisible, non-active region. As illustrated, this nonvisible, non-active region includes cells A6, B6, C6, D6, E1, E2, E3, E4, E5, and E6.

The viewport perimeter 502 has similar properties as those of viewport perimeter 302 discussed with reference to FIG. 3. Additionally, the nonvisible perimeter 528 has similar properties as those of the nonvisible perimeter 428 discussed with reference to FIG. 4. Moreover, the nonvisible, non-active region includes portions of the shared electronic document that has been determined to be less useful to a user and/or client. As such, there may be no rendition of these regions in the cache of the client. Alternatively, there may be a rendition of these regions on the client (such as in a cache), but it may have been determined that this region be designated as non-active.

Figure 6:
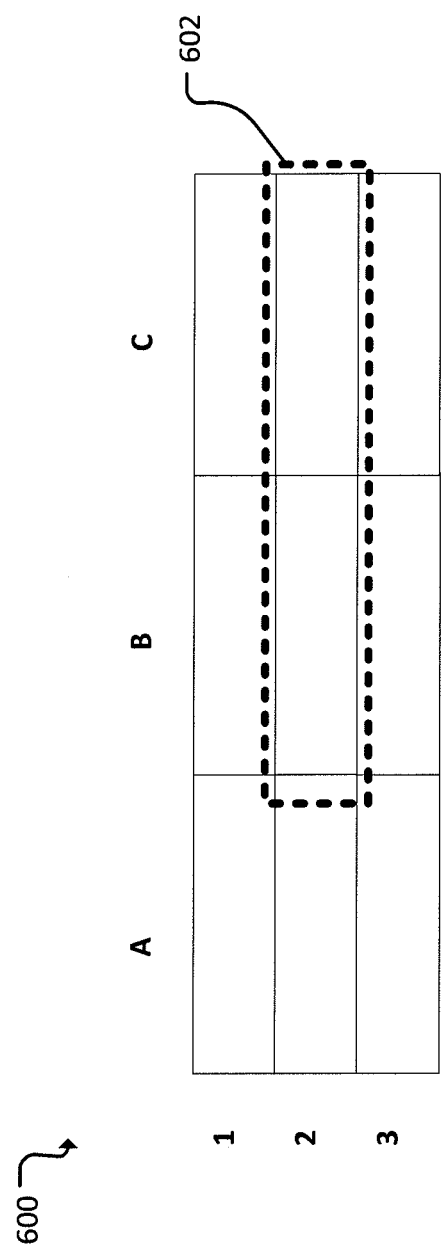
FIG. 6 illustrates an alternative embodiment of shared electronic document that includes a visible active region and a visible non-active region.

FIG. 6 illustrates an alternative embodiment of shared electronic document 600 that includes a visible active region and a visible non-active region. The visible active portion of a shared electronic document 600 is bounded by the active visible perimeter 602. This includes cells B2, and C2. Other, non-active visible cells may be displayed in a viewport of a shared electronic document. For example, cells A1, A2, A3, B1, B3, C1, and C3 are non-active visible cells.

Active visible perimeters 602 bounds active regions of a viewport. For example, the viewport may include cells A1, A2, A3, B1, B2, B3, C1, C2, and C3, but the active region perimeter 602 only bounds cells B2 and C2. In other embodiments, portions of cells may be considered bound by an active visible perimeter 602, while another portion of the cell is not bound by the visible perimeter 602.

Determination as to which portions of the shared electronic document should be designated as an active region may occur at a client or a server. This determination may by a simple definition, such as designating a viewport as an active region, or designating a viewport plus a certain portion of the document in the immediate adjacent area to the current viewport as active. Other times, the active region may be based on a user's specific interaction with a shared electronic document. For example, a user may tend to click between two sheets of a workbook, and the user may only be reviewing certain portions of each sheet. As such, it may be appropriate to designate the portions of the two sheets as an active region (and perhaps the areas immediately adjacent to those areas). Alternatively, historical behavioral tendencies may be used to determine an active region. For example, historical usage may indicate that people tend to click between a chart and a table. Moreover, the active region may be based on whether a cell that is in a viewport is also linked to another cell. For example, an active region may be defined as a viewport plus any cells that are linked to any cell within the viewport. Additionally, it may be advantageous to exclude certain portions of a viewport when assigning an active region. For example, it may not be useful to store header information of a word processing document or spreadsheet if such regions contain no information.

Figure 7:
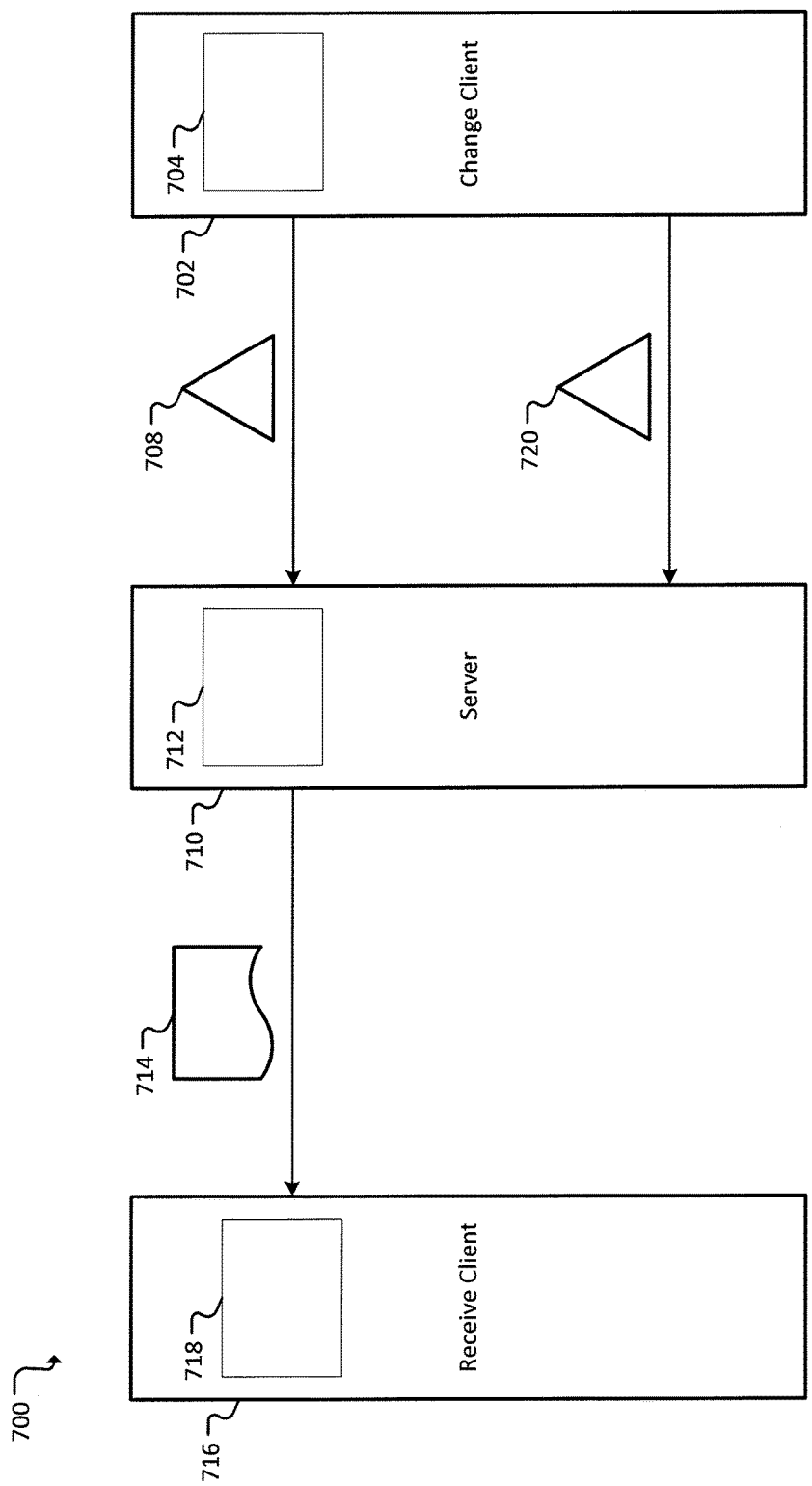
FIG. 7 illustrates an embodiment of a server communicating relevant-change data to a client.

FIG. 7 illustrates an embodiment of a server communicating relevant-change data to a client. In an embodiment, a change-client 702 accesses a locally cached rendition of a shared electronic document 704. The change-client 702 receives indications, e.g., from a user, that a change is desired to be made to the shared electronic document 706 stored by the server 710. The change-client 702 sends change information 708 to the server representing the desired change.

The server 710 interprets change information 708 and updates the shared electronic document 712 accordingly. Additionally, the server 710 determines whether to send relevant-change data 714 to the receive client 716. If relevant-change data 714 is sent to a receive client, then the receive-client updates the received client's 716 locally cached version of the shared electronic document 718 accordingly.

Alternatively, the change information sent by the change client 702 may not prompt the sever 710 to send the receive client 716 relevant change data. For example, as illustrated, change information 720 did not prompt the server to send relevant-change data.

Figure 8:
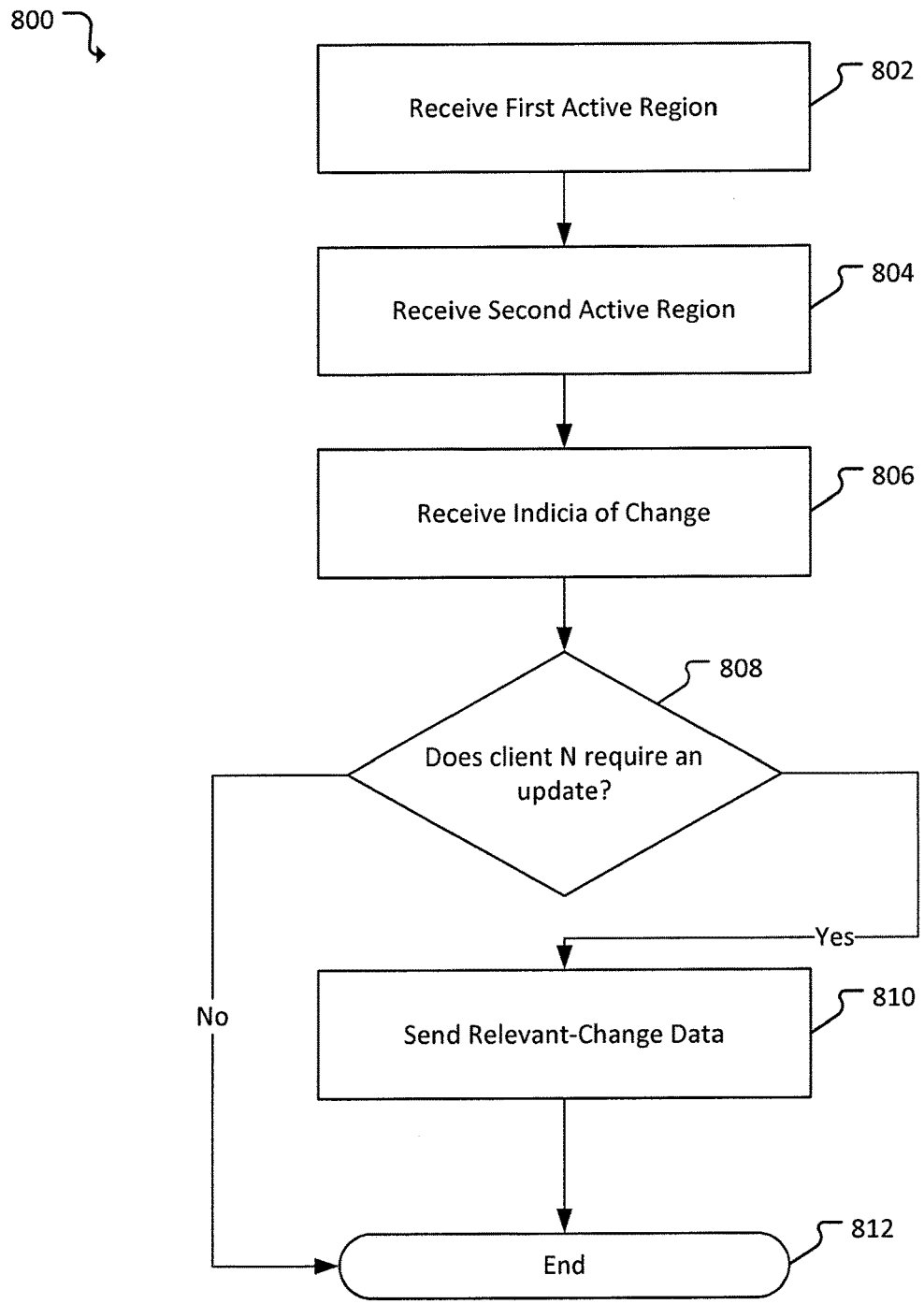
FIG. 8 illustrates a method for determining whether to send information to a client in response to a change to a shared electronic document.

FIG. 8 illustrates a method 800 for determining whether to send information to a client in response to a change to a shared electronic document.

In an embodiment, the method 800 begins with receiving a first active region operation 802. Receiving a first active operation 802 may occur by a client sending information regarding the client's active region information to a server. Receiving the first active region 802 may be accomplished through use of the modules described with reference to FIG. 2. Additionally, the received first active region may be any region discussed with reference to FIG. 3, 4, or 5. The first active region is an active region of a particular client that is currently accessing a document.

The method may continue receiving a second active region operation 804. Receiving a second active region operation 804 may occur by a client sending information regarding the client's active region information. Receiving the second active region 804 may be accomplished through use of the modules described with reference to FIG. 2. Additionally, the received second active region may be any region discussed with reference to FIG. 3, 4, or 5. The client related to the second active region may be a different client than the client related to the first active region. For example, two clients may be accessing the same shared document. The two clients may, however, be interacting with the shared document in a different way. For example, the viewports of the clients may be different, and the active region may be defined such that the viewport is the active region. Alternatively, the same client may be related to both the first active region and the second active region. For example, a user may be interacting with a client which causes the client to send information regarding its active region to the server. At some later time, the user may interact with the client such that the active region needs to be updated. This may occur, for example, when a client changes viewports and the active region is defined as a viewport.

The method may continue to receiving an indicia of change operation 806. The indicia of change indicates that a change to a shared electronic document has occurred. In embodiments, the change may occur as a result of a client changing the contents of a cell in a spreadsheet. In other embodiments, it may be that a client has inserted a row or a column into a spreadsheet, changed the format of a cell, created a table or graph from the spreadsheet, or defined macro data for the spreadsheet. Alternatively, the change may occur as a result of some server side update to the shared electronic document.

Method 800 may continue to a determining whether to send a client an update 808. In embodiments, the server analyzes the received first active regions to determine whether to send an update. For example, the server may compare the active region of a client with the indicia of change. In embodiments, the server may determine to send an update if the active region indicates that the clients current viewport will be affected by the change to a shared document. As such, under this example, a server may determine that a client with a viewport that includes cell A2 should receive an update in response to a change to cell A2.

In other embodiments, determination operation 808 uses historical information to determine whether to send information to a client. For example, an active region may be similar to that referenced in FIG. 4. Additionally, historical information may indicate that users with a particular active region are likely to scroll down and to the right. Or, the historical information may be specific to that user or client. As such, a server may determine to send an update if a change has been received that affects a nonvisible, active region of a shared electronic document.

If the determination operation 808 results in a determination that an update is to be sent, the method 800 then proceeds to send relevant-change data operation 810. Determining what relevant-change data to send in send relevant-change operation 810 is discussed further with reference to FIG. 9.

After the send updated active region operation 810, the method 800 terminates. If the determination operation 808 results in a determination that an update is not to be sent, the method 800 terminates.

Figure 9:
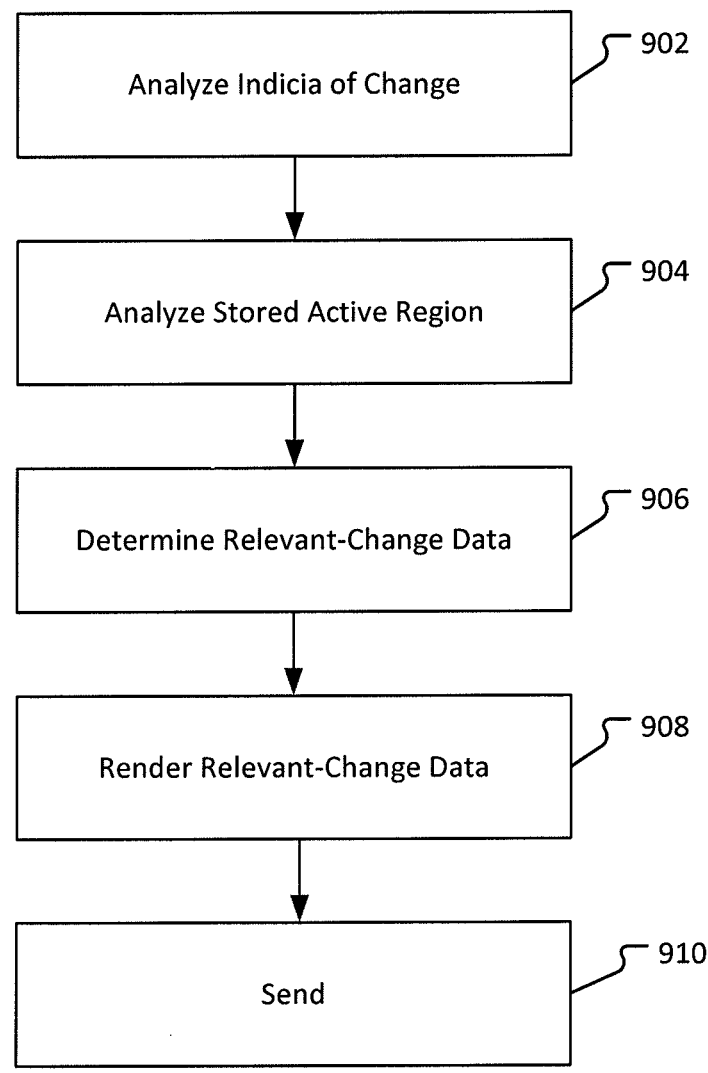
FIG. 9 illustrates a method for determining what information to send to a client in response to a change to a shared electronic document.

FIG. 9 illustrates a method for determining what information to send to a client in response to a change to a shared electronic document.

In embodiments, method 900 begins with analyze indicia of change operation 902. In operation 902, a server analyzes the change made to the shared electronic document. For example, a shared electronic document may be a spreadsheet, and a change to the contents of a cell may be made. The server may then identify what other cells may change based on a change to the contents of that cell.

As illustrated, method 900 continues to analyze stored active region operation 904. In other embodiments, analyze stored active region operation 904 may occur prior to analyze indicia of change operation 902. In operation 904, the server typically identifies the active regions of all or most clients currently accessing the shared electronic document. For example, the server may identify clients that have a viewport that includes the region that has been changed. Alternatively, the server may identify other active regions that may be affected by the change, such as a nonvisible active region.

The method 900 may continue to determine relevant-change data 906. For example, relevant-change data may include an update to a viewport where the active region includes a viewport, and a cell in the viewport has been changed. Additionally, the relevant-change data may include information that is known will be relevant based on historical usage information. This may include nonvisible active region information. The relevant-change data typically includes information regarding the entire active region, as an active region is a region of a shared document that the user is or will likely to be interacting with, and/or regions useful to support a user's current or future interactions.

In an embodiment, the method 900 continues to a render a relevant-change data operation 908. In operation 908, the relevant-change data is rendered into a format useable by a client. After the render active region operation 908, the method 900 proceeds to send operation 910. In send operation 910 the rendered image is sent to a client.

Figure 10:
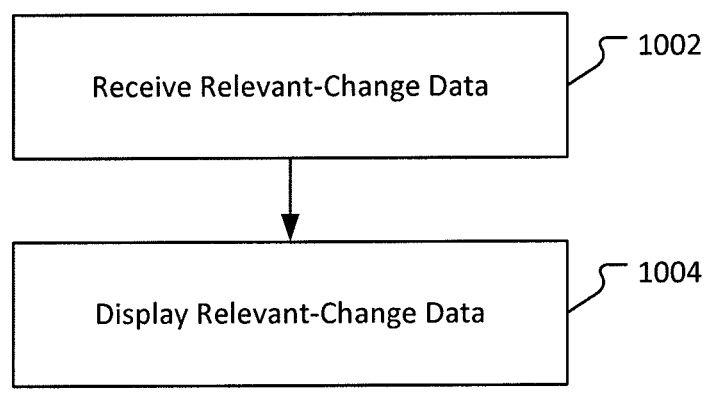
FIG. 10 illustrates a method for a client to receive relevant-change data.

FIG. 10 illustrates a method 1000 for a client to receiving relevant-change data. In embodiments, method 1000 begins with receiving relevant-change data operation 1002. This occurs by a client connecting to a network and receiving relevant-change data. The relevant-change data is typically not received at regular intervals, because the relevant-change data is sent only after a change to a shared electronic document, and the change is determined to be relevant to the client based on the active region.

In embodiments, the method 1000 continues to display relevant-change data 1004. Display operation 1004 may include displaying information related to the change in a viewport of a client. For example, the shared electronic document may be a spreadsheet, and the change to the spreadsheet may be a change to cell A2. Cell A2 may be a variable in cell KK232 of a spreadsheet. A viewport may include cell KK232. In this example, the relevant-change data may be an update to the value in cell KK232. Thus, following this example, the display relevant-change data includes displaying the new value of cell KK232.

Figure 11:
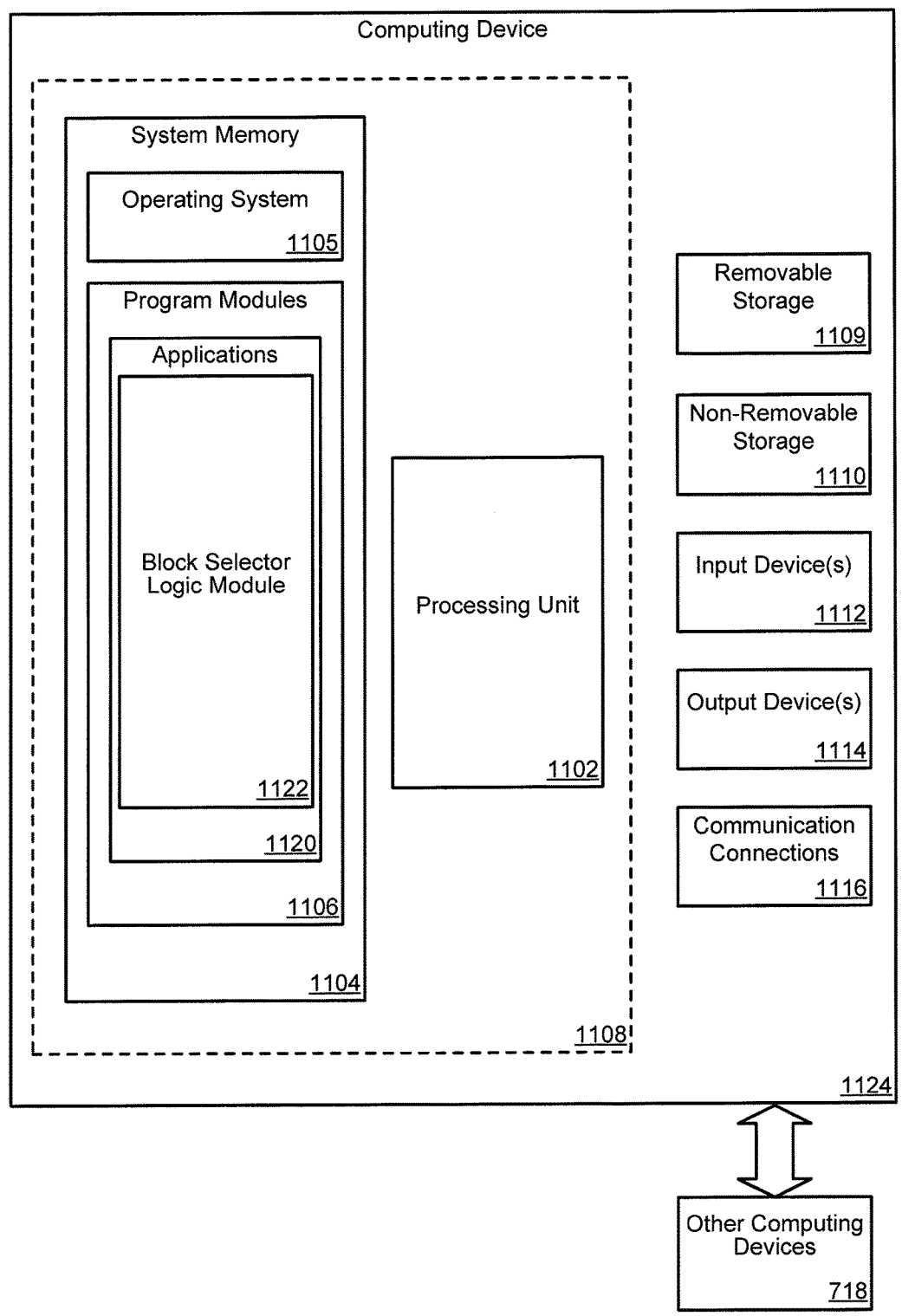
FIG. 11 illustrates one example of a suitable operating environment in which various embodiments may be implemented.
Figure 12A:
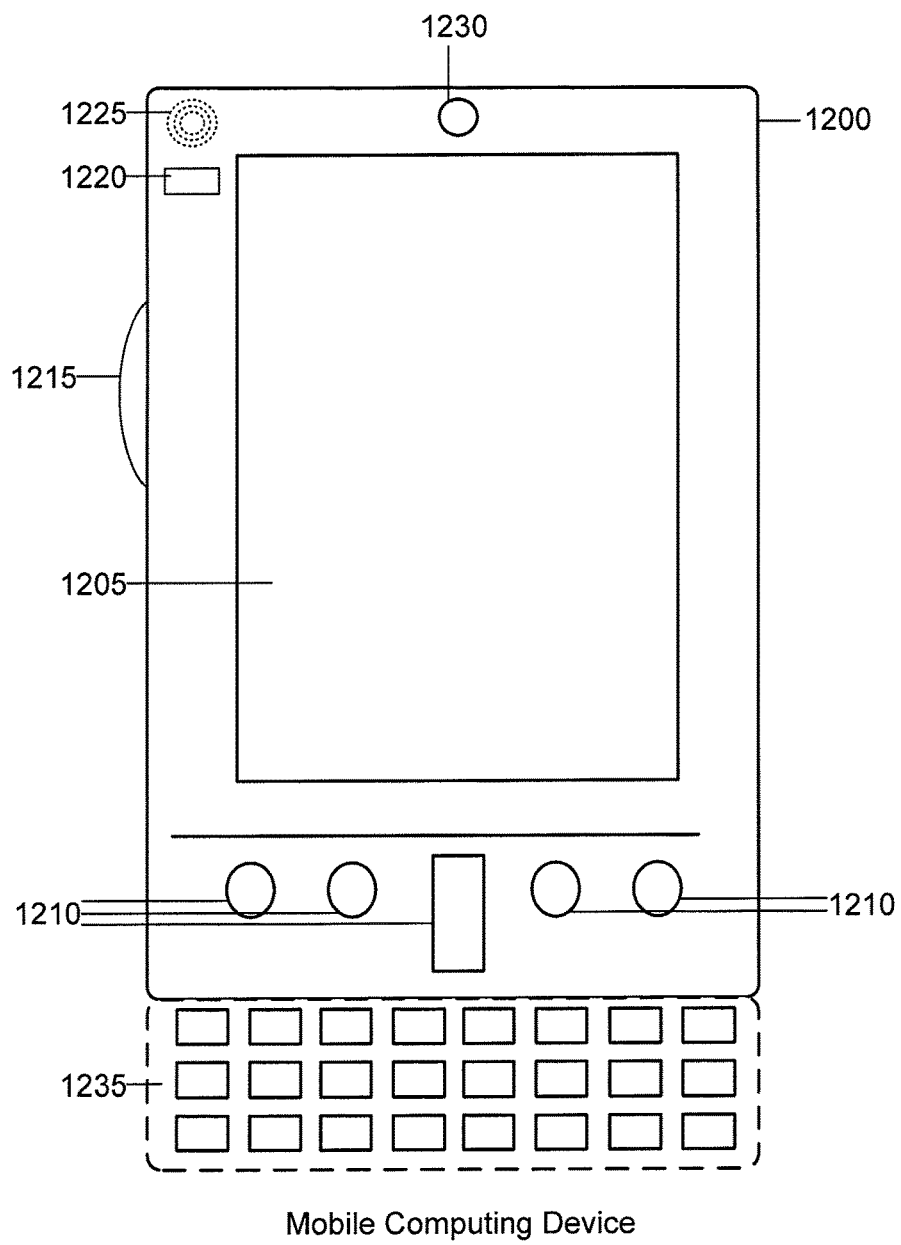
FIG. 12A illustrates one embodiment of a mobile computing device in which various embodiments may be implemented.
Figure 12B:
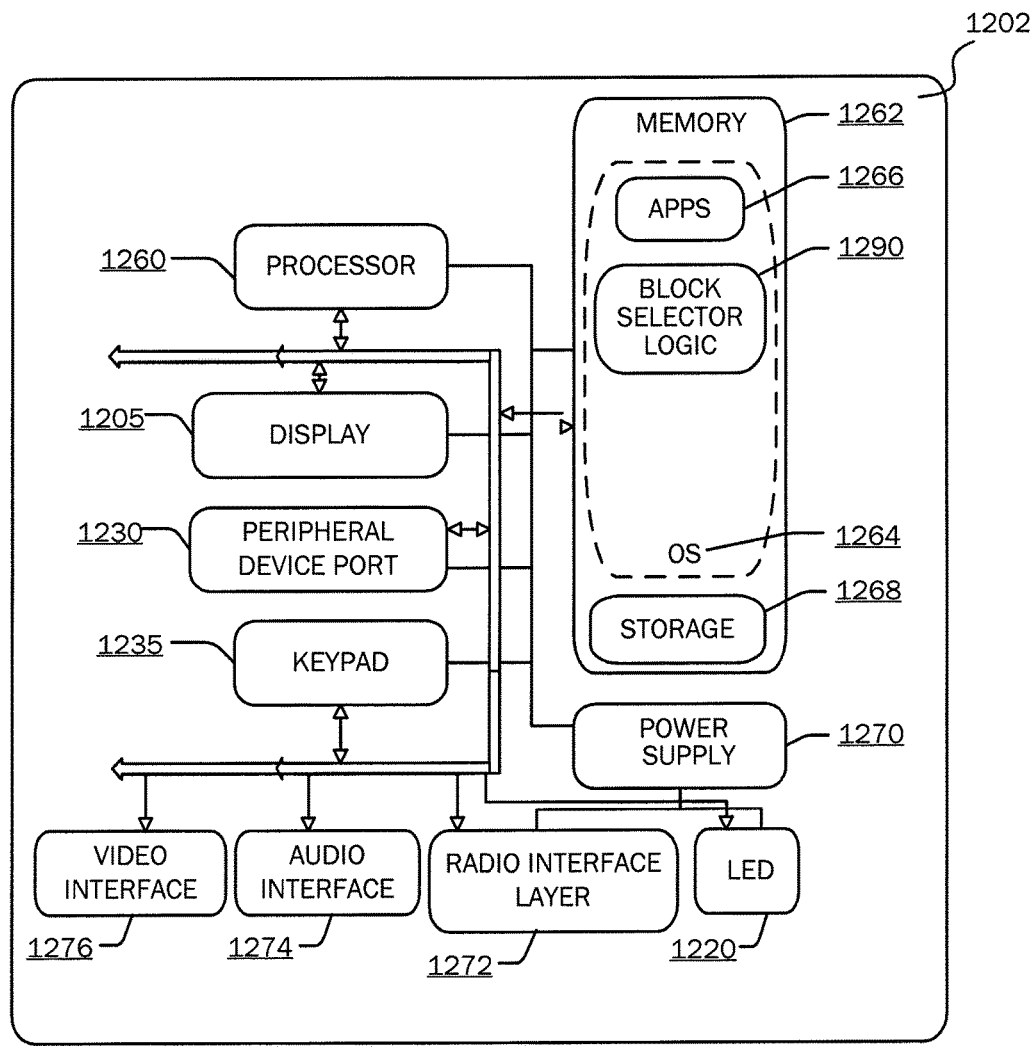
FIG. 12B is a block diagram illustrating the architecture of one embodiment of a mobile computing device suitable for implementing various embodiments.
Figure 13:
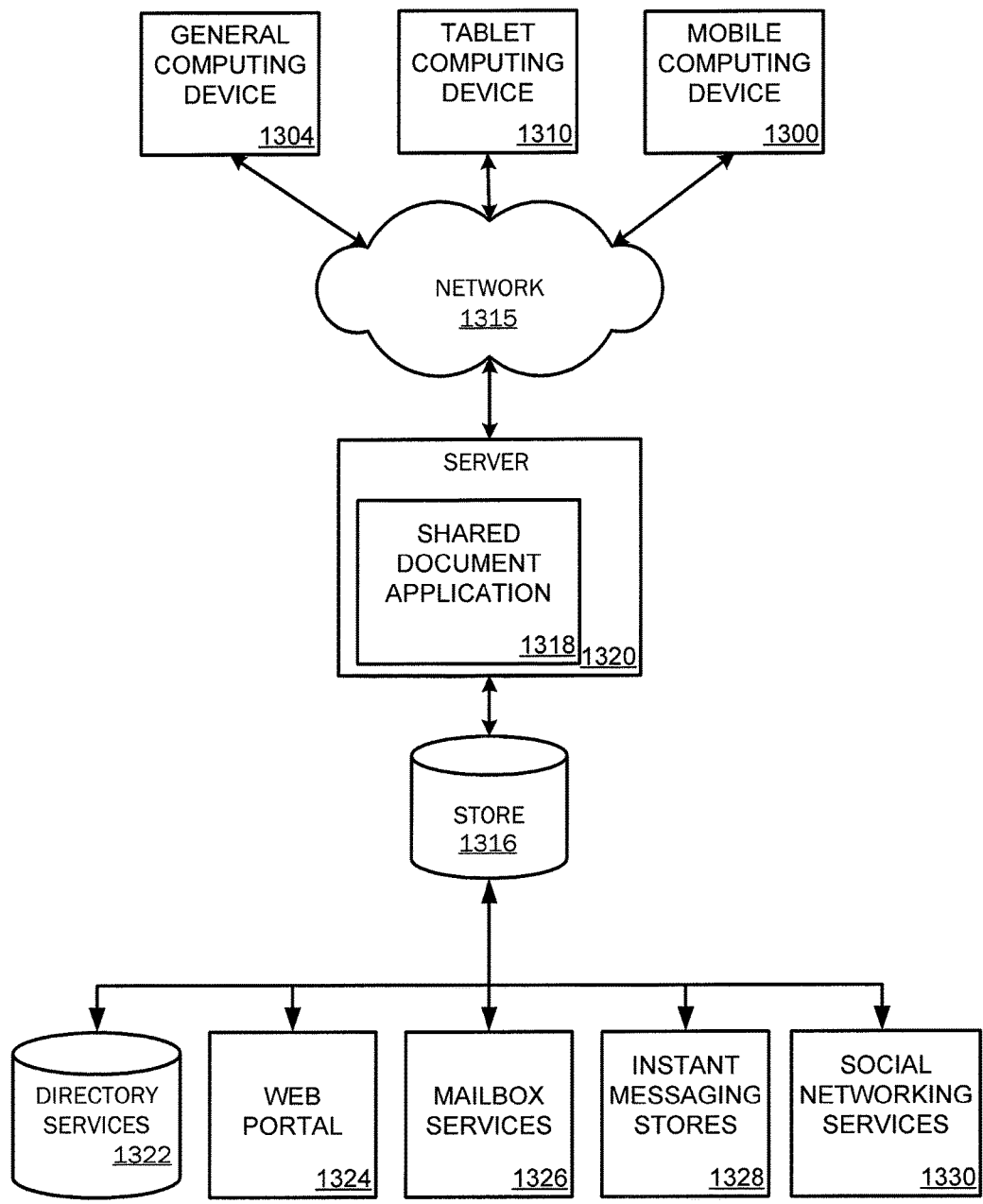
FIG. 13 is a simplified block diagram of a distributed computing system in which embodiments of the present disclosure may be practiced.

FIGS. 11-13 and the associated descriptions provide a discussion of a variety of operating environments in which embodiments of the disclosure may be practiced. However, the devices and systems illustrated and discussed with respect to FIGS. 11-13 are for purposes of example and illustration and are not limiting of a vast number of computing device configurations that may be utilized for practicing embodiments of the disclosure, described herein.

FIG. 11 is a block diagram illustrating physical components (i.e., hardware) of a computing device 1124 with which embodiments of the disclosure may be practiced. The computing device components described below may be suitable for the computing devices described above. In a basic configuration, the computing device 1124 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running software applications 1120 such as the block selector module 1122. The operating system 1105, for example, may be suitable for controlling the operation of the computing device 1124. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1124 may have additional features or functionality. For example, the computing device 1124 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 may perform processes including, but not limited to, one or more of the stages of the method 900 illustrated in FIG. 9. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1124 may also have one or more input device(s) 1112 such as a keyboard, a mouse, a pen, a sound input device, a touch input device, etc. The output device(s) 1114 such as a display, speakers, a printer, etc. may also be included. The aforementioned devices are examples and others may be used. The computing device 1124 may include one or more communication connections 1116 allowing communications with other computing devices 1118. Examples of suitable communication connections 1116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1124. Any such computer storage media may be part of the computing device 1124. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 12A and 12B illustrate a mobile computing device 1200, for example, a mobile telephone, a smart phone, a tablet personal computer, a laptop computer, and the like, with which embodiments of the disclosure may be practiced. With reference to FIG. 12A, one embodiment of a mobile computing device 1200 for implementing the embodiments is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative embodiments, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some embodiments, the mobile computing device 1200 incorporates a vibration transducer for providing the user with tactile feedback. In yet another embodiment, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one embodiment of a mobile computing device. That is, the mobile computing device 1200 can incorporate a system (i.e., an architecture) 1202 to implement some embodiments. In one embodiment, the system 1202 is implemented as a "smart phone" capable of running one or more applications (e.g., browser, e-mail, calendaring, contact managers, messaging clients, games, and media clients/players). In some embodiments, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the block selector logic module 1290 described herein.

The system 1202 has a power supply 1270, which may be implemented as one or more batteries. The power supply 1270 might further include an external power source, such as an AC adapter or a powered docking cradle that supplements or recharges the batteries.

The system 1202 may also include a radio 1272 that performs the function of transmitting and receiving radio frequency communications. The radio 1272 facilitates wireless connectivity between the system 1202 and the "outside world," via a communications carrier or service provider. Transmissions to and from the radio 1272 are conducted under control of the operating system 1264. In other words, communications received by the radio 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 13 is a simplified block diagram of a distributed computing system in which embodiments of the present disclosure may be practiced. Content developed, interacted with, or edited in association with a spreadsheet 1318, and may be stored in different communication channels or other storage types. For example, various documents may be stored using a directory service 1322, a web portal 1324, a mailbox service 1326, an instant messaging store 1328, or a social networking site 1330. A server 1320 may provide the shared document application 1318 to clients. As one example, the server 1320 may be a web server providing the shared document application 1318 over the web. The server 1320 may provide the shared document application 1318 over the web to clients through a network 1315. By way of example, the client computing device may be implemented as the computing device 1304 and embodied in a personal computer, a tablet computing device 1310 and/or a mobile computing device 1300 (e.g., a smart phone). Any of these embodiments of the client computing device 1304, 1310, 1300 may obtain content from the store 1316.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure as claimed in any way. The embodiments, examples, and details provided in this application are considered sufficient to convey possession and enable others to make and use the best mode of claimed disclosure. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

What is claimed:

1. A computer implemented method of exchanging information in a collaborative networked environment, the method comprising:
   receiving information describing a first active region of a shared electronic document from a first client;
   receiving an indicia of a change to the contents of the shared electronic document, wherein the change affects the first active region of the electronic document and affects a second region of the shared electronic document that is outside the first active region;
   determining that the first client requires an update, wherein determining includes determining the change will affect the first active region and a second region that is outside the first active region;
   determining relevant-change data to send to the first client, wherein the relevant change data excludes information to update the second region of the shared electronic document that is outside the first active region;
   sending the relevant-change data to the first client without requiring the relevant-change data to be sent responsive to a request for relevant-change data from the first client and without sending the information to update the second region.

2. The method of claim 1, wherein the indicia of a change to the shared electronic document came from a second client.

3. The method of claim 1, wherein the first active region is a viewport of the first client.

4. The method of claim 1, wherein the shared electronic document is a spreadsheet.

5. The method of claim 4, wherein the change is a change that is selected from the group consisting of a change to value of a cell in the spreadsheet, an addition of an image to the spreadsheet, a change to a value that is linked to a cell in the spreadsheet, and a change to a value that is linked to a chart in the spreadsheet.

6. The method of claim 5, wherein the change is a change to the value of a cell in the spread sheet, and wherein the value of the cell in the spreadsheet affects the value of another cell of the spreadsheet, and further wherein the other cell is located in the first active region of the first client.

7. The method of claim 1, wherein the relevant-change data is information sufficient for the first client to display a new viewport.

8. A computer-readable storage medium, the computer-readable medium storing computer-executable instructions for performing a method of exchanging information in a collaborative networked environment, the method comprising:
   receiving information describing a first active region of a shared electronic document from a first client;
   receiving an indicia of a change to the contents of the shared electronic document, wherein the change affects the first active region of the electronic document and affects a second region of the shared electronic document that is outside the first active region;
   determining that the first client requires an update, wherein determining includes determining the change will affect the first active region and a second region that is outside the first active region;
   determining relevant-change data to send to the first client, wherein the relevant change data excludes information to update the second region of the shared electronic document that is outside the first active region;
   sending the relevant-change data to the first client without requiring the relevant-change data to be sent responsive to a request for relevant-change data from the first client and without sending the information to update the second region.

9. The computer-readable storage medium of claim 8, wherein the indicia of the change to the shared electronic document came from a second client.

10. The computer-readable storage medium of claim 8, wherein the first active region is a viewport of the first client.

11. The computer-readable storage medium of claim 8, wherein the shared electronic document is a spreadsheet.

12. The computer-readable storage medium of claim 11, wherein the change is a change that is selected from the group consisting of a change to value of a cell in the spreadsheet, an addition of an image to the spreadsheet, a change to a value that is linked to a cell in the spreadsheet, and a change to a value that is linked to a chart in the spreadsheet.

13. The computer-readable storage medium of claim 12, wherein the change is a change to a value of a cell in the spreadsheet, and the change to the value of the cell in the spreadsheet affects the value of another cell of the spreadsheet, and further wherein the other cell is located in the first active region of the first client.

14. The computer-readable storage medium of claim 8, wherein the relevant-change data includes information sufficient for the first client to display a new viewport.

15. A system for exchanging information in a collaborative networked environment, the system comprising:
   a computer processor electronically coupled to an input device, an output device, a network communication device, a storage device, and memory;

wherein the network communication device receives information regarding a change to a shared electronic document;

wherein the output device displays information regarding the shared electronic document through a viewport;

wherein the network communication device sends information regarding changes to the boundary of an active region of the shared electronic document;

wherein the network communication device receives relevant-change data regarding the shared electronic document without requiring the network communication device to transmit a request for the relevant-change data and without receiving relevant-change data outside the active region of the shared electronic document; and wherein after the network communication device receives the relevant-change data, the contents of the active region of the shared electronic document is updated based upon the relevant-change data, and further wherein a region of the shared electronic document that is outside the active region is not updated based upon the relevant-change data.

16. The system of claim 15, wherein the update to the active region includes an update to the viewport.

17. The system of claim 15, wherein the active region is determined by the computer processor to be the viewport.

18. The system of claim 15, wherein the shared electronic document is a spreadsheet.

19. The system of claim 18, wherein the relevant-change data is a change to a cell in the viewport that is affected by a cell value that is outside of the active region.

20. The system of claim 19, wherein the active region is larger than the viewport.

* * * * *